United States Patent [19]

Medlar

[11] 4,397,331

[45] Aug. 9, 1983

[54] FLUID FLOW CONTROL VALVE WITH MAXIMIZED NOISE REDUCTION

[75] Inventor: Lewis A. Medlar, Oreland, Pa.

[73] Assignee: Honeywell Inc., Minneapolis, Minn.

[21] Appl. No.: 947,265

[22] Filed: Sep. 29, 1978

[51] Int. Cl.³ ................... F16K 47/02; F16K 47/14
[52] U.S. Cl. .............................. 137/375; 137/625.38; 137/625.3; 251/127
[58] Field of Search ............... 137/625.37, 625.38, 137/625.3, 375; 251/127

[56] References Cited

U.S. PATENT DOCUMENTS

| | | | |
|---|---|---|---|
| 3,648,718 | 3/1972 | Curran | 137/625.37 X |
| 3,802,537 | 4/1974 | White | 137/625.3 X |
| 3,894,716 | 7/1975 | Barb | 251/127 |
| 3,990,475 | 11/1976 | Myers | 137/625.3 |
| 4,024,891 | 5/1977 | Engel et al. | 137/625.3 |
| 4,040,440 | 8/1977 | Zaki | 137/375 |
| 4,103,702 | 8/1978 | Duthion et al. | 137/625.3 X |

FOREIGN PATENT DOCUMENTS 565966  8/1975  Switzerland ............... 137/625.3

OTHER PUBLICATIONS

Masoneilan Bulletin No. 370 E SA of Masoneilan International, Inc., Norwood, Mass. dated 5/5/77.

*Primary Examiner*—Arnold Rosenthal
*Attorney, Agent, or Firm*—Mitchell J. Halista

[57] ABSTRACT

The valve includes a perforated cage and a perforated closed end tube operating as two sequential stages of restriction and pressure drop for the fluid flowing through the valve. A movable plug cooperates with the cage to control the net amount of flow restriction presented to the fluid, and hence to control the pressure drop across the valve and the rate of fluid flow through the valve. The tube perforations are sized to turn back the practical maximum of the first stage noise into the tube, and the latter is lined with material which absorbs a maximum of the turned-back noise. As a result, the level of the noise passing downstream of the valve is minimized.

3 Claims, 1 Drawing Figure

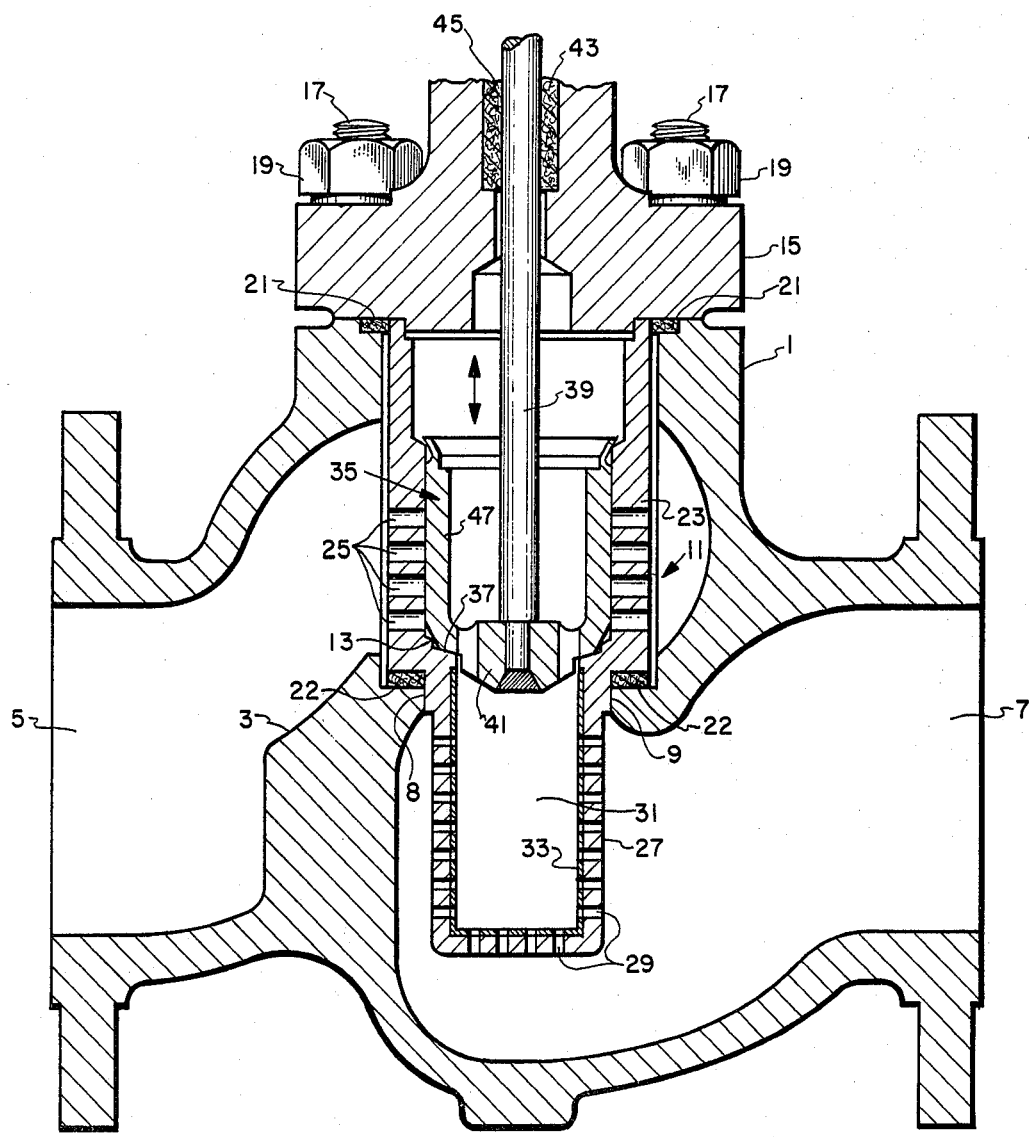

FLUID FLOW CONTROL VALVE WITH MAXIMIZED NOISE REDUCTION

BACKGROUND OF THE INVENTION

1. Field of the Invention

The present invention relates generally to fluid flow control valves provided with means for reducing and minimizing the noise which such valves produce as fluid flows therethrough. Specifically, the invention relates to the type of such valves which are known as low noise valves, wherein the valves themselves are constructed to operate at lower noise levels than corresponding valves of ordinary construction. More specifically, the invention relates to that form of low noise valve wherein the control of the fluid pressure drop across the valve, and the control of the rate of fluid flow through the valve, are effected by the use of perforated or equivalent members which impose controllable fluid restrictions along the fluid flow path through the valve, and wherein a degree of noise reduction is effected by dividing the restrictions and resulting pressure drop into sequential stages.

2. Description of the Prior Art

Numerous constructions have been suggested in the past for effecting valve noise reduction and minimization. The more popular ones of those constructions have included the sequential restriction and pressure drop low noise valve construction noted above, a similar arrangement wherein a diffuser is added to a valve downstream of the valve's internal restriction, and the arrangement wherein a muffler is attached to the outlet priping of a valve. Each of these three known constructions will now be briefly described.

The above-noted low noise valve construction including sequentially disposed perforated or equivalent members providing sequential stages of restriction and pressure drop is known in the art in several forms. Typical of such constructions are the double cage valve construction which is disclosed in the Curran U.S. Pat. No. 3,648,718, the stacked disc valve construction which is disclosed in the Barb U.S. Pat. No. 3,894,716, the reacting stream valve construction which is disclosed in the Myers U.S. Pat. No. 3,990,475, and the spaced disc valve construction which is disclosed in the Engel et al U.S. Pat. No. 4,024,891. In each of such valve constructions, a plug is movable to vary the effective area of the valve flow path by varying the area, and hence the restricting and pressure-dropping effect, of the restrictions, thereby to provide the above-noted control of the fluid pressure drop across the valve and the rate of flow of fluid through the valve.

The principle which is responsible for the noise reduction which is achieved in each of the noted forms of low noise valves is that, if the total restriction and pressure drop present in such a valve is divided or broken down into two or more portions or stages or restrictions acting in sequence or series, the sum of the noises individual to the several series restrictions or stages is significantly less than the noise which would be produced for the same fluid flow and pressure drop conditions if the restriction were not so divided, and hence if all of the pressure drop occurred across a single restriction. For example, according to this principle, a given fluid flowing at a given rate through a valve and experiencing a pressure drop will produce significantly less noise if the given pressure drop occurs across two restrictions in series, as distinguished from occurring across a single restriction of a size required to produce the same pressure drop.

For convenience, the term restriction as used herein identifies each arrangement or stage which effects one of the series pressure drops in a low noise valve as described above, notwithstanding the fact that such a restriction may well actually be in the form of a plurality of perforations, apertures, or fluid passageways acting in parallel on the fluid flow. The total restriction present in such a valve for any given plug position is thus the sum of the individual series restrictions or stages, or simply the sum of the restrictions as defined above.

Also for convenience, any such a valve as described above, including means to divide its total restriction and pressure drop into two or more series stages to effect noise improvement, reduction, or minimization, will be referred to hereinafter simply as a low noise valve. Further, a valve of the same nominal size as a given low noise valve but not including such dividing of its restriction into stages will be referred to hereinafter as the standard counterpart of the given low noise valve.

In the diffuser arrangement referred to above as the second of the more popular noise reducing constructions, a diffuser, which is usually in the form of a perforated closed end tube or chamber, is placed on the downstream side of an existing valve. The diffuser functions to reduce noise in much the same way as does an additional stage of restriction within a low noise valve as described above.

The known forms of low noise valves, operating according to the above-noted divided pressure drop principle, have indeed operated at lower noise levels as compared to their standard counterparts. Similarly, the noted practice of adding a diffuser to a valve has generally been effective to reduce the noise produced by the valve. However, noise reduction to greater extents than those provided by the known arrangements is required or desired in many applications. Heretofore, it has been necessary to add additional pressure dropping stages in the process of obtaining such desired additional noise reduction, with the resultant undesirable increase in the size, complexity, and cost of the valve structure. The attachment of diffusers to valves has the further disadvantage of requiring hardware exterior of the valves.

In the third of the known constructions referred to above, wherein a muffler is located on the downstream side of a valve, noise energy is changed into heat energy as the fluid and noise pass through the filling material of the muffler. However, this procedure for reducing valve noise has the disadvantages of subjecting the fluid to the muffler material, of the clogging and/or contaminating of the muffler material by the fluid, and of requiring an extra piece of hardware exterior of the valve.

SUMMARY OF THE INVENTION

Accordingly, it is an object of the present invention to provide an improved low noise valve construction which exhibits an improvement in noise reduction with respect to the known low noise valve constructions, but which does this without requiring additional integral pressure dropping stages or attached devices such as diffusers or mufflers.

To the end of accomplishing the above-noted and other desirable objects, a low noise valve according to the present invention is constructed to include at least first and second ones of the above-noted perforated members in the fluid flow path through the valve, with the second member downstream of the first member. These first and second members are positioned and arranged with the necessary space or chamber between them to cause them to provide two of the above-described sequential pressure-dropping stages, whereby a measure of noise reduction is achieved in the manner described above.

The desired improvement or increase in the noise reduction which it is the object of the invention to provide is achieved in the improved valve structure of the invention by constructing that valve to dissipate as much as possible of the noise energy, hereinafter referred to simply as noise, which appears in the above-noted chamber. Said noise is produced in the chamber by the pressure dropping action of the first stage perforated member, and, if not dissipated, must pass out of the chamber and appear in the valve outlet. Such maximized dissipation of the chamber noise is effected according to the invention by:

(a) Constructing the second perforated member to pass as little as possible of the noise along with the fluid, and to reflect or turn back as much as possible of the noise into the chamber, thereby forcing the reflected noise to follow a new or separated path out of the chamber through the solid parts of the second member in lieu of the usual noise path which coincides with the fluid path through the perforations of the second member; and (b) Constructing or equipping the second member to provide a maximum attenuation of the noise as it passes along the new, separated path which the noise is now forced to follow.

By so forcing a maximized separation between the fluid and noise paths, and then maximizing the attenuation of the noise in the new, separated path which the noise is forced to follow, the dissipation of the chamber noise is maximized, and the level of the noise passing downstream of the valve is minimized. Consequently, a maximum degree of noise reduction is achieved.

The terms maximum and maximization are used herein in the sense of being or making as much or as large as possible and practical under the circumstances. Similarly, the terms minimum and minimization are used herein in the sense of being or making as little or as small as possible and practical under the circumstances.

As will be explained further hereinafter, the noise reflection and the resulting separation between the fluid path and the noise path of (a) above may well be achieved according to the invention by properly sizing the perforations in the second member, making use of the acoustic principle that the smaller the perforations are in a wall, the smaller will be the amount of the noise which those perforations will pass, and the larger will be the amount of the noise which those perforations will reflect or turn back. Further, the noise attenuation of (b) above may well be achieved according to the invention by constructing or equipping the second member to absorb as much as possible of the noise passing along the new noise path.

In practice, the first member may well have the form of the usual perforated cylindrical valve cage member. Also, the second member may well be in the form of the perforated wall of a perforated closed end tube which cooperates with the cage to form the above-noted chamber, the tube perforations being as small as practical to maximize the noted noise reflection and path separation, and the tube having a noise absorbing lining which maximizes the absorption and hence attenuation of the noise along its path, thereby to maximize the dissipation of that noise.

BRIEF DESCRIPTION OF THE DRAWING

A better understanding of the present invention may be had from the following detailed description when read in connection with the accompanying drawing, wherein the single FIGURE is a sectional front elevational view of a valve constructed according to the invention.

DETAILED DESCRIPTION

The Valve of the Drawing

The valve illustrated in the drawing, and constituting a preferred example of the above-described improved valve embodying the present invention, includes a valve body 1 containing a partition 3 which separates a fluid inlet passageway 5 from a fluid outlet passageway 7. The partition 3 contains an opening 8 between the two passageways which receives the intermediate portion 9 of a cage 11. The portion 9 is in the form of a hollow cylindrical shell, and is provided with an internal cage seat 13. The cage 11 is held in the body 1 by a cover or bonnet 15 which is secured to the body 1 by means of studs 17 and cooperating nuts 19. Gaskets 21 and 22 seal the cage 11 within the body 1 and the cover 15.

In addition to the intermediate portion 9, the cage 11 includes an upper cylindrical cage portion 23 which contains perforations 25. For convenience of description, this second or upstream portion 23 of the cage 11 will be referred to herein as the perforated member or cage member, and its perforations 25 will be referred to herein as cage perforations.

In addition to the portions 9 and 23, the cage 11 includes a lower or wall portion 27 which is in the form of a closed end hollow cylinder or tube and which contains wall perforations 29 in both its cylindrical surface and its end. For convenience of description, this third or downstream portion 27 of the cage 11 will be referred to herein as the wall means, wall portion, or wall member, and its perforations 29 will be referred to herein as wall perforations.

The construction which has been described above causes the wall member 27 to cooperate with the rest of the cage 11 to form a chamber 31 on the downstream side of the cage perforations 25, and hence between the latter and the wall perforations 29. Accordingly, the fluid flow path through the valve can be traced from the inlet passageway 5 and through the cage perforations 25, the chamber 31, the wall perforations 29, and the outlet passageway 7 to the exterior of the valve.

The purpose of the chamber 31 is to cause the cage perforations 25 and the wall perforations 29 to provide two sequential stages of restriction and pressure drop for the fluid flowing along the fluid flow path of the valve. In accordance with the low noise valve principle set forth hereinbefore, this construction effects a reduction in the noise produced by the valve as compared to its standard counterpart.

In accordance with the invention, the wall member 27 is so constructed that its wall perforations 29 are as small as possible consistent with the requirement that they be economically producible. This is done to obtain the above-noted maximized noise reflection and noise path—fluid path separation in the chamber 31, as will be more fully explained below in connection with the description of the operation of the illustrated valve. When the fluid flowing through the valve is a gas, an additional requirement as to the size and number of the wall perforations 29 is that their total area must be greater than that of the cage perforations 25.

Also in accordance with the invention, the inner surface of the wall member 27, and thus the interior surface of most of the chamber 31, is constructed or provided with a noise-absorbing lining 33. This lining of the chamber interior is done to effect the above-noted absorption of the noise passing along the noise path, as will be explained more fully below in connection with the description of the operation of the improved valve of the drawing.

The illustrated valve also includes a hollow cylindrical plug 35 which is slidably fitted and received within the cage member 23. The plug 35 is provided with a plug seat 37.

The plug 35 is shown in the drawing in its lower-most or fully closed position, wherein the plug seat 37 is in fluid sealing engagement with the cage seat 13. The plug 35 is axially movable relative to the cage member 23 from this illustrated, valve-closed position and through a full range of partly open positions to a fully open position in which the plug seat 37 is separated from the cage seat 13 to a maximum extent.

The axial movement and positioning of the plug 35 relative to the cage member 23 as just described is effected through the medium of a stem 39 which is secured to the lower portion 41 of the plug 35. The stem 39 is axially slidable within packing 43 which is located in a bore 45 of the cover 15. The packing 43 is maintained in fluid-tight relationship with the stem 39 by the usual means, not shown, in order to prevent fluid leakage along the stem 39 to the exterior of the valve. The stem 39 would normally be connected at its upper end to the usual valve positioning device, not shown, which would, in practice, impart the desired axial plug-positioning movement to the plug 35 by way of the stem 39.

Operation of the Valve of the Drawing

When the plug 35 occupies the position illustrated in FIG. 1, the fluid path between the inlet passageway 5 and the outlet passageway 7 is totally interrupted, and the valve is in the fully closed position. Progressive upward movement of the plug 35 from its illustrated fully closed position first opens the fluid path with a maximum degree of restriction provided by the cage perforations 25, and then progressively decreases the amount of restriction which those perforations present in that fluid path. Specifically, as the plug 35 is moved progressively upward, more and more of the cage perforations 25 are introduced into the fluid path as the lower edge of the wall 47 of the plug uncovers more and more of the inner ends of those perforations. Accordingly, the axial position of the plug 35 within the cage member 23 determines the effective area of the fluid path through the valve.

Fluid flowing from the inlet passageway 5 and through the available ones of the cage perforations 25 passes into the chamber 31 and then follows a fluid path through the wall perforations 29. The cage perforations 25 subject the flowing fluid to a first stage of restriction and pressure drop which are accompanied in the usual manner by the generation of noise in the chamber 31. This noise tends to follow the fluid flow through the wall perforations 29 and thus appear in the outlet passageway 7, where it would combine with the noise which is generated by the second stage pressure dropping action of the wall perforations 29 to form the total noise passing downstream of the valve. Accordingly, it can be said that the noise in the chamber 31 tends to follow a noise which coincides with the fluid path through the wall perforations 29.

However, by constructing the wall member 27 in the described manner to make the wall perforations 29 as small as practical, a maximum of the noise is prevented from flowing along the path through the wall perforations 29. This maximum of the noise is, instead, reflected or turned back into the chamber 31. This takes place in accordance with the aforementioned acoustic principle that:

(a) Perforations in a wall will permit noise to flow through them, and hence will pass noise, only for noise frequencies above a certain frequency, known as the cutoff frequency, and will reflect or turn back noise of frequencies below the cutoff frequency;

(b) The smaller the diameter of the perforations, the higher the cutoff frequency; and (c) Thus, when the perforations are made to be as small as possible, the amount of noise which can pass through the perforations is minimized, and the amount of noise which is reflected back by the perforations is maximized.

Accordingly, in the illustrated valve, the described construction of the wall member 27 and the wall perforations 29 causes a maximum of the noise to be reflected back into the chamber and thus prevented from following the noise path through the wall perforations 29.

Since the noise which is reflected back into the chamber 31 is prevented from leaving the chamber over its' usual noise path, the noise is forced to follow some other noise path out of the chamber. This is so because of the fact that noise which is trapped in the chamber 31 builds up in pressure until it forces its way out of the chamber over some path. In the present case, this new noise path is through the solid parts of the wall member 27. Accordingly, the reflecting action of the wall perforations 29 can be said to establish a new noise path, separated from the fluid path, for the noise to pass over in leaving the chamber 31, and thus can be said to effect or force a maximum separation between the fluid path and the actual or followed noise path out of the chamber 31.

Since the noise-absorbing lining 33 is present on the interior surface of the wall member 27, it is positioned on the new, separated noise path described above. Consequently, the path which the noise is forced to follow passes through the lining 33, which absorbs a maximum of the noise attempting to leave the chamber 31 and converts the energy of that noise into heat energy.

It is in this way that the wall member 27 effects a maximum separation between the fluid path and the noise path. This desirably permits the lining 33 to deal with the noise path separately from the fluid path, and thus to absorb the noise without affecting the fluid flow. The result is an effective dissipation of a maximum of the noise in the chamber 31.

Consequently, substantially the only part of the chamber noise which appears in the outlet passageway 7 is the above-noted minimal remainder which is not reflected back by the wall perforations 29. Thus, the lining 33 minimizes the transmission of the noise out of the chamber 31, and hence minimizes the level of the noise passing downstream of the valve.

The practical importance and significance of providing the lining 33 to attenuate and dissipate the noise on the separated noise path becomes clearer when it is noted what would take place in the illustrated valve in the absence of such dissipation, which is what takes place in the known low noise valves and valve-diffuser arrangements. With such absence of means to deal with the chamber noise, the pressure of that noise would build up in the chamber 31 until that pressure forced the noise to be conducted and transmitted out of the chamber through the solid parts of the wall member 27 and into the outlet passageway 7. There, the so expelled noise would recombine with the fluid and would join and augment the portion of the noise which initially came through the wall perforations 29, thereby defeating any original noise separating action provided by those perforations. But such transmission, recombination, and augmentation do not occur in the illustrated valve because of the construction and operation which absorbs the reflected noise and thus maintains its separation from the fluid. It is in this way that the valve construction according to the invention causes the level of the total noise leaving the illustrated valve to be significantly lower than in the case of conventional valves or valve-diffuser arrangements operating under the same conditions but without the benefit of means for dissipating the chamber noise.

The construction illustrated in the drawing is applicable also to valves having more than two stages. In order to minimize the total noise produced by such a valve, each stage should have the noise separating and absorbing construction of the illustrated stage including the wall member 27 and the lining 33.

The noise absorbing portion of the illustrated valve has been shown as the lining 33 on the inner surface of the wall member 27. An example of a suitable material for that lining is lead. The wall member 27 itself would, of course, have to be constructed of a material which would withstand the fluid pressure. If desired, the noise absorbing material could be placed on the outer surface of the wall member 27 instead of or in addition to being placed on the inside surface as illustrated. Also, if the fluid pressure would permit, the entire wall member 27 could be constructed of noise absorbing material in lieu of having such material merely on one or both of its surfaces. Moreover, the noise absorbing material could be in the form of a coating applied to one or both of the surfaces of the wall member 27.

As mentioned hereinbefore, the wall perforations 29 are desirably made as small as possible consistent with the requirement that they be economically producible. This means that those perforations should not be so small that their production is prohibitively expensive. Excessively small perforations are difficult to produce and, in addition, usually make it necessary to provide an uneconomically large number of them in meeting the flow requirements of the valve. Moreover, excessively small perforations tend to become clogged in use. Perforation diameters of the order of one-eighth of an inch to one-sixteenth of an inch represent a practical compromise by being practical to produce and yet yielding a usefully high value of the above-described cutoff frequency.

It is believed to be clear from the foregoing description that the described improved valve fulfills the objects stated herein. Thus, it has been shown that the valve both separates noise from the fluid and maintains the separation by dissipating the separated noise by absorption. The result is a valve construction which exhibits a significant improvement in noise reduction in comparison with the known low noise valve and diffuser constructions, and does this without requiring additional pressure dropping stages or attached devices.

The embodiments of the invention in which an exclusive property or privilege is claimed are defined as follows:

1. In a fluid flow control valve having a fluid path, means for controlling the effective area of said path, and a perforated member having its perforations located in fluid pressure dropping relationship in said path, the improvement for minimizing the noise produced by the passage of fluid through said perforations, comprising a perforated wall located in cooperative relation to said perforated member to form a chamber on the downstream side of said member perforations, the wall perforations in said wall being of a size to establish a maximized noise cutoff frequency to cause that portion of said noise having frequencies below said cutoff frequency to be reflected back into said chamber and to follow a noise path through the solid parts of said wall, thereby to maximize the separation of the path of said noise from the path of the fluid through said wall perforations, and a noise absorbing lining located on the interior surface of said wall within said chamber to absorb said reflected noise along said noise path and thus minimize the transmission of said noise downstream of said chamber.

2. In a fluid flow control valve having a fluid path, means for controlling the effective area of said path, and a perforated member having its member perforations located in fluid pressure dropping relationship in said path to provide a first pressure dropping stage, the improvement for minimizing the noise produced by the passage of fluid through said perforations, comprising a second pressure dropping stage located along said fluid path downstream of said first stage, said second stage including a perforated wall having wall perforations and forming with said perforated member a chamber between said member perforations and said wall perforations, the latter being of a size to minimize the passage of said noise through said wall perforations, whereby a maximum of said noise is reflected back into said chamber by said wall perforations and is forced to follow a noise path through the solid parts of said wall, and a maximum separation between the path of said noise and the fluid path through said wall perforations is thus produced, and a noise absorbing lining located on the interior surface of said wall within said chamber to absorb said reflected noise along said noise path and thus minimize the transmission of said noise downstream of said second stage.

3. In a fluid flow control valve including a body having a fluid inlet passageway and a fluid outlet passageway, including a cage having a cage wall and seat and a set of perforations passing through said cage wall, said cage being secured with said body to place said seat and said perforations in series in a fluid path between said passageways, and including a plug slidably fitted within said cage and having a plug seat, said plug being axially movable in said cage between a first position wherein said plug seat engages said cage seat and interrupts said path, and a second position wherein said plug seat is separated from said cage seat to open said path, the improvement for minimizing the noise produced by the passage of fluid through said perforations, comprising a closed end tube secured to said cage and having a wall which cooperates with said cage wall to form a chamber on the downstream side of said cage perforations, said tube wall containing wall perforations which are sized to minimize the passage of said noise therethrough and to reflect a maximum of said noise back into said chamber to cause said reflected noise to follow a noise path through the solid parts of said tube wall, whereby a maximum separation is produced between the path of said noise and the path of the fluid through said wall perforations, and noise absorbing means associated with said tube to absorb said reflected noise along said noise path and thus minimize the transmission of said noise downstream of said chamber, wherein said noise absorbing means consists of a noise absorbing lining located on the interior surface of said wall within said chamber to absorb said reflected noise along said noise path.

* * * * *